(12) United States Patent
Krymski

(10) Patent No.: US 7,876,362 B2
(45) Date of Patent: *Jan. 25, 2011

(54) HIGH SPEED CMOS IMAGE SENSOR CIRCUITS WITH BLOCK MEMORY READOUT

(76) Inventor: Alexander Krymski, 1028 N. Lake Ave., Suite 206, Pasadena, CA (US) 91104

( * ) Notice: Subject to any disclaimer, the term of this patent is extended or adjusted under 35 U.S.C. 154(b) by 0 days.

This patent is subject to a terminal disclaimer.

(21) Appl. No.: 12/643,875

(22) Filed: Dec. 21, 2009

(65) Prior Publication Data

US 2010/0097507 A1  Apr. 22, 2010

Related U.S. Application Data

(62) Division of application No. 11/243,239, filed on Oct. 4, 2005, now Pat. No. 7,659,925.

(51) Int. Cl.
*H04N 5/228* (2006.01)
*H04N 5/335* (2006.01)
*H04N 3/14* (2006.01)
*H01L 27/00* (2006.01)
*H03M 1/12* (2006.01)

(52) U.S. Cl. .................. 348/222.1; 348/300; 348/301; 348/302; 250/208.1; 341/155

(58) Field of Classification Search ............ 348/222.1, 348/300–302, 308; 341/126, 155, 159
See application file for complete search history.

(56) References Cited

U.S. PATENT DOCUMENTS 5,757,520 A  5/1998  Takashima (Continued)

FOREIGN PATENT DOCUMENTS

JP  2001-024954  1/2001

OTHER PUBLICATIONS

A. Krymski et al., "A High Speed, 500 Frames/s, 1024×1024 CMOS Active Pixel Sensor", 1999 Symposium on VLSI Circuits Digest of Technical Papers, 1999, Kyoto, Japan, pp. 137-138.

(Continued)

*Primary Examiner*—Lin Ye
*Assistant Examiner*—Chia-Wei A Chen
(74) *Attorney, Agent, or Firm*—Foley & Lardner LLP

(57) ABSTRACT

An image sensor circuit includes a pixel array, a plurality of column analog-to-digital conversion (ADC) circuits, and at least two memory blocks. Each column ADC circuit is connected to receive analog pixel signals provided from corresponding pixel circuits of the pixel array, and is configured to convert the received analog pixel signals into digital pixel signals. Each memory block is connected to receive digital pixel signals provided from corresponding column ADC circuits of the plurality of column ADC circuits. At least two of the at least two memory blocks are connected to receive digital pixel signals that are provided from corresponding column ADC circuits that are located to a same side of the pixel array. Each memory block of the at least two memory blocks includes a plurality of memory cells, one or more sense amplifiers connected to the memory cells by a readout bus, and a memory controller.

20 Claims, 10 Drawing Sheets

U.S. PATENT DOCUMENTS

| | | | |
|---|---|---|---|
| 6,115,065 A | | 9/2000 | Yadid-Pecht et al. |
| 6,137,432 A | * | 10/2000 | Xiao .......................... 341/169 |
| 6,545,624 B2 | * | 4/2003 | Lee et al. .................... 341/155 |
| 6,552,745 B1 | | 4/2003 | Perner |
| 6,573,936 B2 | | 6/2003 | Morris et al. |
| 6,661,457 B1 | * | 12/2003 | Mathur et al. ............... 348/273 |
| 6,870,565 B1 | * | 3/2005 | Blerkom et al. ............. 348/294 |
| 6,953,923 B2 | | 10/2005 | Yang et al. |
| 7,408,443 B2 | * | 8/2008 | Nam .......................... 340/308 |
| 7,488,928 B2 | * | 2/2009 | Krymski .................. 250/208.1 |
| 7,489,357 B2 | * | 2/2009 | Nakada ...................... 348/321 |
| 7,659,925 B2 | * | 2/2010 | Krymski .................. 348/222.1 |
| 2003/0011829 A1 | | 1/2003 | Dierickx |
| 2003/0043089 A1 | | 3/2003 | Hanson et al. |

OTHER PUBLICATIONS

S. Kleinfelder et al., "A 10,000 Frames/s CMOS Digital Pixel Sensor", IEEE Journal of Solid State Circuits, vol. 36, No. 12, pp. 2049-2059, Dec. 2001.

PCT International Search Report and Written Opinion report dated Aug. 29, 2007, from PCT application PCT/US06/38643.

Office Action dated Sep. 18, 2008 from U.S. Appl. No. 11/243,239.

Office Action dated Jan. 30, 2009 from U.S. Appl. No. 11/243,239.

Office Action dated Jul. 21, 2009 from U.S. Appl. No. 11/243,239.

Examiner Initiated Interview Summary and Office Action dated Aug. 24, 2009 from U.S. Appl. No. 11/243,239.

Notice of Allowance dated Dec. 14, 2009 from U.S. Appl. No. 11/243,239.

* cited by examiner

HIGH SPEED CMOS IMAGE SENSOR CIRCUITS WITH BLOCK MEMORY READOUT

CROSS-REFERENCE TO RELATED PATENT APPLICATIONS

This application is a divisional application of U.S. patent application Ser. No. 11/243,239, filed Oct. 4, 2005, entitled "High Speed CMOS Image Sensor Circuits with Block Memory Readout", the entire contents of which are incorporated by reference herein.

BACKGROUND OF THE INVENTION

1. Field of the Invention

Embodiments of the present invention relate generally to image sensor circuits and, in specific embodiments, to an image sensor circuit including a pixel array, a plurality of column analog-to-digital conversion (ADC) circuits, and at least two memory blocks connected to receive digital pixel signals from corresponding column ADC circuits, where at least two of the at least two memory blocks are connected to receive digital pixel signals provided from corresponding column ADC circuits that are located to a same side of the pixel array, and where each of the at least two memory blocks includes a plurality of memory cells, one or more sense amplifiers connected to the plurality of memory cells by a readout bus, and a memory controller.

2. Related Art

Image sensors have found wide application in consumer and industrial electronics, and have enabled an explosion in the number of digital cameras and digital video devices used for work and entertainment. In many applications, and especially in industrial applications, there is a constant demand for image sensors with faster processing speed and better image quality. Thus, developers of image sensors place a high priority on identifying speed bottlenecks in image sensor designs that can limit the increasing of imager speed, and they expend great effort in attempting to eliminate such bottlenecks.

For many years, the image sensor industry was dominated by charge coupled device (CCD) technology, but there has recently been a dramatic shift toward the manufacturing of solid state imaging devices using complimentary metal oxide semiconductor (CMOS) processes in order to increase the speed and reliability of image sensors and to reduce the cost of manufacturing the image sensors. Solid state imaging devices manufactured using CMOS processes are known as CMOS image sensors. While consumer CMOS image sensors for general consumer applications typically have one or two analog-to-digital conversion (ADC) circuits on an entire image sensor chip, CMOS image sensors for more demanding applications typically utilize one ADC circuit per column of pixel circuits, or per several columns, or even two ADC circuits per column for faster processing speed and, thus, are known as high speed CMOS image sensors.

Examples of related art high speed CMOS image sensor circuits are disclosed in the following references: (i) U.S. Pat. No. 6,870,565 entitled "Semiconductor Imaging Sensor Array Devices with Dual-Port Digital Readout", the contents of which are incorporated by reference herein and which is hereinafter referred to as reference 1; (ii) U.S. Patent Application Publication Number 2003/0043089 entitled "Doubling of Speed in CMOS Sensor with Column-Parallel ADCs", the contents of which are incorporated by reference herein and which is hereinafter referred to as reference 2; and (iii) A. Krymski et al., "A High Speed, 500 frames/s, 1024×1024 CMOS Active Pixel Sensor", 1999 Symposium on VLSI Circuits Digest of Technical Papers, 1999, Kyoto, Japan, pp. 137-138, the contents of which are incorporated by reference herein and which is hereinafter referred to as reference 3.

FIG. 1 illustrates a simplified architecture of a prior art high speed CMOS image sensor circuit 10. As illustrated in FIG. 1, the image sensor circuit 10 comprises a pixel array 20, a row decoder/driver 24, a column ADC block 30, an ADC controller 34, a memory 41, a memory controller 44, a readout bus 45, sense amplifiers 46, pad drivers 48, and pads 50. The pixel array 20 comprises pixel circuits 22 that are arranged in rows and columns. Each pixel circuit 22 comprises a light sensitive element, such as a photodiode and the like, to sample light intensity of a corresponding portion of a scene being imaged, and each pixel circuit 22 is configured to produce an analog pixel signal based on the sampled light intensity.

The row decoder/driver 24 supplies control signals to the pixel circuits 22 in the pixel array 20 to control an operation of the pixel circuits 22. Pixel circuits 22 that are in a same row of the pixel array 20 may share a common row control signal from the row decoder/driver 24. Pixel circuits 22 that are in a same column of the pixel array 20 may share a common column readout line to provide output. The row decoder/driver 24 typically controls the pixel circuits 22 to perform processing row by row.

The analog pixel signals output from the pixel array 20 are input to the column ADC block 30. The column ADC block 30 typically comprises one column ADC circuit 32 for each column of pixel circuits 22 in the pixel array 20. Each column ADC circuit 32 is configured to convert analog pixel signals received from the pixel array 20 into corresponding digital pixel signals. The ADC controller 34 controls an operation of the column ADC circuits 32, and may also control an operation of the row decoder/driver 24.

The digital pixel signals output from the column ADC block 30 are input to the memory 41. The memory 41 may comprise, for example, random access memory (RAM) cells RAM0 42 and RAM cells RAM1 43, such as in the embodiments disclosed in reference 1. Also, an example of a dual-port 2 row static RAM (SRAM) cell is illustrated in FIG. 3 of reference 3. Each RAM cell RAM0 42 stores bits from a digital pixel signal output from a corresponding column ADC circuit 32. The bits stored in each RAM cell RAM0 42 are then output and stored into a corresponding RAM cell RAM1 43. The bits stored in each RAM cell RAM1 43 are then output on readout bus 45 to sense amplifiers 46. The readout bus 45 typically comprises multiple bit lines, so that multiple bits may be transferred simultaneously. The memory controller 44 controls an operation of the RAM cells RAM0 42 and the RAM cells RAM1 43. The outputs of the sense amplifiers 46 are provided to pad drivers 48, and the pad drivers 48 drive digital signals to pads 50 that are located in various positions on the image sensor circuit 10.

In order to identify bottlenecks that limit the increasing of image sensor speed, it is helpful to first examine some constraints under which typical high speed CMOS image sensor circuits operate. A typical row processing time for a high speed CMOS image sensor circuit, such as the image sensor circuit 10 is, for example, from 500 ns to several microseconds. A typical number of columns of pixel circuits in a pixel array may be, for example, between 1,000 and 2,000 columns. Pixel control signals from a row decoder/driver to pixel circuits, and ADC control signals from an ADC controller to column ADC circuits may occupy, for example, dozens of nanoseconds because they only happen, for example, once or twice per each row processing time.

In contrast, unlike pixel circuit operations and column ADC circuit operations, memory readouts from memory cells, such as RAM cells, occur, for example, in very tight sub-clock timing. Typically, a half of a clock time is used to precharge bit lines of a readout bus, and another half of the clock time is used for reading signals from the memory cells and sensing the signals by sense amplifiers. Thus, each memory operation takes, for example, only a few nanoseconds. When clock rates for image sensor circuits, such as the image sensor circuit 10, are increased, the memory readout operations have been found to be some of the first operations to fail. As a consequence, memory readout operations have become a bottleneck for present-generation high speed CMOS image sensor circuits that can prevent further increases in image sensor speed and, hence, can prevent further increases in processing data rates.

The memory used in high speed CMOS image sensor circuits, such as the memory 41, differs from other types of memory used in applications outside of the image sensor context, because while other types of memory may typically be on the order of, for example, 1 mm long, the memory used in high speed CMOS image sensor circuits is typically on the order of, for example, 10 mm to 20 mm long. The long length of memory typically used in high speed CMOS image sensor circuits is due in part to the design of image sensors in which, for example, one or more memory cells are used for each column of pixel circuits in a pixel array, and in which the memory cells are arranged to span the length of the pixel array.

Since the number of columns of pixel circuits in a pixel array for a high speed CMOS image sensor circuit is typically between, for example, 1,000 and 2,000 columns, the length of a memory that spans the length of the pixel array is very long. Also, in order to improve image quality, it is desirable to use larger pixel circuits, which further leads to an increase in the length of the memory. A further difference between memory used in high speed CMOS image sensor circuits and memory typically used in other applications is that the memory for high speed CMOS image sensor circuits is usually configured to accept large amounts of data in parallel from a large number of column ADC circuits, while other types of memory are usually not designed to accept as much data in parallel.

In related art image sensor circuit designs, as the length of memory has increased, the length of bit lines in a readout bus, such as the readout bus 45, for reading out bits from memory have also increased correspondingly. Thus, the length of a readout bus, such as the readout bus 45, usually spans the length of a pixel array and is also typically on the order of, for example, 10 mm to 20 mm long. The extremely long lengths of readout buses from memories of related art image sensor circuits have various consequences, as will now be further explained.

As the lengths of bit lines of a readout bus increase, a resistance and a capacitance associated with the bit lines also increase. In addition, when more memory cells are added to a bit line, a capacitance associated with the bit line further increases. Thus, bit lines of a readout bus in related art image sensor circuits that have lengths, for example, on the order of 10 mm to 20 mm long, and that are connected to, for example, on the order of 1,000 to 2,000 memory cells, have high resistances and high capacitances. The high resistance of the bit lines due to the long lengths of the bit lines and the high capacitance of the bit lines due to the large number of memory cells connected to the bit lines may lead to signal degradation, and may impose physical limitations on a speed of memory readout operations.

It is instructive to consider a delay estimate for a 20 mm long readout bus in order to better understand limitations on readout operations that are imposed by a long readout bus. A typical resistance of a 20 mm long metal wire line that is 0.5 $\mu$m wide and that has resistivity of 0.1 Ohm/square is (20,000/0.5*0.1)=4 kOhm. A capacitance of the line, not including memory cell output capacitances, is approximately (0.1 fF/$\mu$m*20,000 $\mu$m)=2 pF. Thus, the RC constant is 8 ns, which means that readout operations could not even be performed at a frequency of 100 MHz.

Moreover, when bit lines of a readout bus from memory are extremely long and, for example, span the length of a pixel array, an additional problem is created in that data signals must travel across the length of the bit lines to sense amplifiers, and then are driven by pad drivers to pads that may be located in various positions all over the image sensor circuit. Such a situation is especially problematic when signals must be driven by pad drivers to pads that are located in locations, with respect to the sense amplifiers, that are in the opposite direction of the direction in which the data signals travel across the bit lines from the memory cells to the sense amplifiers. In such a case, the pad drivers must drive the signals to pads that are located all the way back across the image sensor circuit. Driving the data signals over longer distances may result in higher power consumption to drive the signals, and may also lead to the injection of noise into a substrate that is part of the image sensor circuit.

In related art image sensor circuits, a typical skew time between signal arrival at a pad that is located closest to a pad driver and signal arrival at a pad that is located farthest away from the pad driver can be on the order of, for example, 5 ns. Such skew time may not be a very severe issue when a system clock is less than 100 MHz, but such skew time will become a severe issue as system clocks for image sensor circuits are increased to 200 MHz and higher. Also, a skew time on the order of, for example, 5 ns is large enough to require attention by systems that receive signals from pads of an image sensor circuit.

In order to increase the speed of image sensor circuits, some related art image sensor circuits allow for utilizing two analog processing and digitizing circuits, such as two column ADC blocks, each comprising a plurality of column ADC circuits, where one of the analog processing and digitizing circuits is located above a pixel array and the other analog processing and digitizing circuit is located below the pixel array in the image sensor circuit. Imaging systems with such configurations are disclosed in reference 2, although reference 2 was not the first reference to disclose imaging systems with such configurations.

FIG. 2 illustrates a simplified architecture of a prior art high speed CMOS image sensor circuit 60 having both a top column ADC block 80*a* above a pixel array 70 and a bottom column ADC block 80*b* below the pixel array 70. The image sensor circuit 60 further comprises a top memory 90*a*, a top readout bus 95*a*, top sense amplifiers 96*a*, and top pad drivers 98*a* that are located above the pixel array 70, and a bottom memory 90*b*, a bottom readout bus 95*b*, bottom sense amplifiers 96*b*, and bottom pad drivers 98*b* that are located below the pixel array 70. The image sensor circuit 60 also includes a plurality of pads 100.

The image sensor circuit 60 may be configured such that, for example, analog pixel signals output from pixel circuits in odd columns of the pixel array 70 are input to the top column ADC block 80*a* and analog pixel signals output from pixel circuits in even columns of the pixel array 70 are input to the bottom column ADC block 80*b*. In such a configuration, a number of memory cells in top memory 90*a* for receiving digital pixel signals from top column ADC block 80*a* can be reduced in half as compared to, for example, a number of RAM cells in the memory 41 of the image sensor circuit 10, because there would only need to be enough memory cells to store pixel values from the odd columns in the pixel array 70. As a consequence, a number of memory cells connected to the top readout bus 95*a* can also be reduced in half as compared to, for example, the number of RAM cells connected to the readout bus 45 of the image sensor circuit 10. A similar reduction in a number of memory cells connected to the bottom readout bus 95*b* would also result from such a configuration.

By reducing, in half, a number of memory cells connected to the top readout bus 95*a* as compared to, for example, the number of RAM cells connected to the readout bus 45 of the image sensor circuit 10, a capacitance associated with the top readout bus 95*a* is correspondingly reduced. However, in high speed CMOS image sensor circuit designs, even with the number of memory cells connected to a readout bus reduced in half, the number of memory cells connected to the readout bus may still be on the order of, for example, 500 to 1,000 memory cells, which may still result in a large amount of capacitance.

Furthermore, even in configurations with both the top memory 90*a* and the bottom memory 90*b*, there is still the problem that the top readout bus 95*a* and the bottom readout bus 95*b* span the length of the pixel array 70. Thus, a resistance associated with the top readout bus 95*a* and a resistance associated with the bottom readout bus 95*b* still remain high, as the lengths of the readout buses may still be, for example, on the order of 10 mm to 20 mm long. The high resistance and the high, though reduced, capacitance of the top readout bus 95*a* and the bottom readout bus 95*b* still impose a limit on increasing the speed of memory readout operations and, thus, the memory readout operations still remain a bottleneck.

By having the top sense amplifiers 96*a* and the top pad drivers 98*a*, signals can be driven to pads 100 located on a top portion of the image sensor circuit 60 with less power than would be required to drive signals from the bottom of the image sensor circuit 60 to the pads 100 located on the top portion of the image sensor circuit 60. However, because signals must travel across the top readout bus 95*a* to the top sense amplifiers 96*a* and then to the top pad drivers 98*a*, there is still a problem in that signals must travel a long way in one direction across the top readout bus 95*a* to the top sense amplifiers 96*a* and then must be driven a long distance by the top pad drivers 98*a* back across the image sensor circuit 60 to pads 100 located on a left portion of the image sensor circuit 60. The driving of signals across the image sensor circuit 60 results in high power consumption, and may result in the injection of digital noise into a substrate that is part of the image sensor circuit 60. Similar problems exist in driving signals by the bottom pad drivers 98*b* to pads 100 located on the left portion of the image sensor circuit 60.

Also, in order to increase the speed of image sensor circuits, some related art image sensor circuits use multiple buses to perform readout of data from memory. For example, some related art image sensor circuits include 8 buses, where memory cells 1, 9, 17, . . . in a row are connected to a first bus, memory cells 2, 10, 18, . . . in the row are connected to a second bus, and so on for each bus, where the memory cells in the row that are connected to a same bus are separated by 8 memory cells. The memory cells 1-8 can then be selected at once for memory readout. Such a configuration reduces a number of memory cells connected to a single bus by, for instance, 8 times and, as a result, reduces a capacitance associated with each bus as compared to a single bus configuration. However, even in such a configuration, each readout bus must still have a length that spans a length of the pixel array and is on the order of, for example, 10 mm to 20 mm long. Thus, such a configuration still has the problems that are associated with long readout buses as discussed above.

While memory readout operations are one bottleneck that limits the increasing of imager speed, another bottleneck is the amount of time needed to send control signals from an ADC controller to all column ADC circuits in a column ADC block. For example, in the image sensor circuit 10, the ADC controller 34 must supply control signals to the column ADC circuits 32 of the column ADC block 30. Since the ADC controller 34 is located to the left of the column ADC block 30, control lines from the ADC controller 34 to column ADC circuits 32 located near the right side of the column ADC block 30 are very long because the column ADC block 30 is typically around the same length as the pixel array 20, which may be, for example, on the order of 10 mm to 20 mm long. The time needed for control signals to reach all column ADC circuits from an ADC controller further imposes a limit on an increasing of imager speed.

In the area of CCD technology, there has been known an architectural method known as "paneling" for increasing the data rate of image sensors based on CCD technology. With paneling, a CCD image sensor is formed by several independent CCD panels, each having a separate pixel array and separate amplifiers, and each performing a separate readout. An example of paneling in a CCD image sensor is disclosed in U.S. Pat. No. 5,757,520 entitled "Color Linear Image Sensor and an Image Processing System", where FIG. 8 of U.S. Pat. No. 5,757,520 illustrates two CCD sensor chips packed into a single sensor package.

However, there has been a problem with paneling in CCD technology in that a discontinuity between panels of pixels may result in an image non-uniformity at the boundaries of the panels. Such image non-uniformities may be unacceptable to end users. Also, a difference between the amplifiers serving separate panels and a difference in local parasitic effects between panels may result in response non-uniformities between the panels. The problems arise due in part to the splitting of pixel arrays into separate panels, where each pixel array outputs analog signals.

In light of the above mentioned problems, there is a need for high speed CMOS image sensor circuits that allow for reducing an amount of time required for memory readout operations. There is also a need for high speed CMOS image sensor circuits that allow for reducing the distance that signals must be driven to reach output pads. In addition, there is a need for high speed CMOS image sensor circuits that allow for reducing an amount of time required to send control signals from an ADC controller to column ADC circuits in a column ADC block. It is also desired that such high speed CMOS image sensor circuits be easy to design and implement, and that they preserve the uniformity of output images.

SUMMARY OF THE DISCLOSURE

An image sensor circuit in accordance with a general embodiment of the present invention includes a pixel array, a plurality of column analog-to-digital conversion (ADC) circuits, and at least two memory blocks. The pixel array includes a plurality of pixel circuits arranged in rows and columns. Each pixel circuit of the plurality of pixel circuits is configured to sample light intensity and to provide a corresponding analog pixel signal based on the sampled light intensity. Each column ADC circuit of the plurality of column ADC circuits is connected to receive analog pixel signals provided from corresponding pixel circuits of the plurality of pixel circuits and is configured to convert the received analog pixel signals into digital pixel signals.

Also, each memory block of the at least two memory blocks is connected to receive digital pixel signals provided from corresponding column ADC circuits of the plurality of column ADC circuits. At least two of the at least two memory blocks are connected to receive digital pixel signals from corresponding column ADC circuits that are located to a same side of the pixel array. Each memory block of the at least two memory blocks includes a plurality of memory cells, one or more sense amplifiers connected to the plurality of memory cells by a readout bus, and a memory controller. The plurality of memory cells are configured to store digital pixel values corresponding to the received digital pixel signals. The one or more sense amplifiers allow for reading out the stored digital pixel values from the plurality of memory cells over the readout bus. The memory controller of each memory block is connected to the plurality of memory cells of the memory block and is configured to control operations of the plurality of memory cells of the memory block.

In various embodiments, the at least two of the at least two memory blocks are located entirely to one side of the pixel array. Also, in various embodiments, the at least two memory blocks are three or more memory blocks. In some embodiments, a length of the readout bus of each memory block of the at least two memory blocks is less than a length of a row of pixel circuits in the pixel array. Also, in some embodiments, a length of the readout bus of each memory block of the at least two memory blocks is less than one-half of a length of a row of pixel circuits in the pixel array. In further embodiments, a length of the readout bus of each memory block of the at least two memory blocks is less than one-fourth of a length of a row of pixel circuits in the pixel array.

In various embodiments, a total number memory cells that are connected to the readout bus in each memory block of the at least two memory blocks is less than one-eighth of a number of pixel circuits in a row of pixel circuits in the pixel array. Also, in various embodiments, a total number memory cells that are connected to the readout bus in each memory block of the at least two memory blocks is less than one-sixteenth of a number of pixel circuits in a row of pixel circuits in the pixel array.

Thus, various embodiments of the present invention relate to image sensor circuits with block memory readout. The use of memory blocks allows for reducing lengths of bit lines of readout buses from memory cells and also allows for reducing a number of memory cells connected to each bit line of a readout bus. By reducing the lengths of the bit lines, a resistance and a capacitance associated with each of the bit lines can be reduced. By reducing the number of memory cells connected to each bit line, a capacitance associated with each of the bit lines can be further reduced. As a consequence of reducing the resistance and the capacitance associated with each of the bit lines, a speed of memory readout operations can be increased and, hence, a processing data rate of the image sensor circuits can be increased.

In addition, since the splitting of memory into blocks mainly only affects digital operations in which data corruption can be limited, and basically does not affect fine analog operations, the splitting of the memory into blocks can be done without leading to a noticeable non-uniformity effect in images being output. Moreover, a block memory architecture may reduce design and manufacturing costs, because memory blocks can be designed for one portion of an image sensor circuit and then can be mirrored to be placed in other locations on the image sensor circuit.

In various embodiments, an image sensor circuit further includes a plurality of left pads located on a left portion of the image sensor circuit with respect to a center of the pixel array, and a plurality of right pads located on a right portion of the image sensor circuit with respect to the center of the pixel array. In further embodiments, a first memory block of the at least two memory blocks is located entirely on the left portion of the image sensor circuit and is connected to provide digital signals to the plurality of left pads, and a second memory block of the at least two memory blocks is located entirely on the right portion of the image sensor circuit and is connected to provide digital signals to the plurality of right pads. In some embodiments, digital signals from each memory block of the at least two memory blocks are supplied to corresponding local pads that are located on a same portion of the image sensor circuit as the memory block.

Moreover, in various embodiments, a first memory block of the at least two memory blocks is configured such that digital signals placed on the readout bus of the first memory block from the plurality of memory cells of the first memory block travel to the left over the readout bus of the first memory block to corresponding sense amplifiers of the one or more sense amplifiers of the first memory block and are then driven to corresponding left pads of the plurality of left pads. In yet further embodiments, a second memory block of the at least two memory blocks is configured such that digital signals placed on the readout bus of the second memory block from the plurality of memory cells of the second memory block travel to the right over the readout bus of the second memory block to corresponding sense amplifiers of the one or more sense amplifiers of the second memory block and are then driven to corresponding right pads of the plurality of right pads.

Thus, a block memory architecture allows for shorter routing distances from memory cells of memory blocks to pads on an image sensor circuit. As a result, a block memory architecture may allow for reducing an amount of power needed to drive signals to pads, and may allow for reducing an amount of digital noise injected into a substrate of an image sensor circuit due to the driving of signals to pads.

Furthermore, image sensor circuits in accordance with embodiments of the present invention may have more than one ADC controller for a subset of a plurality of column ADC circuits, where the subset of the plurality of column ADC circuits receive analog signals output from a same side of a pixel array. For example, one ADC controller may be located on a left side of the subset of the plurality of column ADC circuits, and another ADC controller may be located on a right side of the subset of the plurality of column ADC circuits. In such configurations, control pulse propagation delays for control signals sent over control lines from the ADC controllers to the column ADC circuits may be reduced. As a result, such image sensor circuits may allow for increasing a speed of column ADC circuit operations and, hence, may allow for increasing imager speed.

In various embodiments, the image sensor circuit further comprises a plurality of bottom-left pads located on a bottom-left portion of the image sensor circuit with respect to a center of the pixel array, a plurality of bottom-right pads located on a bottom-right portion of the image sensor circuit with respect to the center of the pixel array, a plurality of top-left pads located on a top-left portion of the image sensor circuit with respect to the center of the pixel array, and a plurality of top-right pads located on a top-right portion of the image sensor circuit with respect to the center of the pixel array.

In yet further embodiments, a first memory block of the at least two of the at least two memory blocks is located entirely on the bottom-left portion of the image sensor circuit and is connected to provide digital signals to the plurality of bottom-left pads. In still further embodiments, a second memory block of the at least two of the at least two memory blocks is located entirely on the bottom-right portion of the image sensor circuit and is connected to provide digital signals to the plurality of bottom-right pads. In yet further embodiments, a first additional memory block of at least two additional memory blocks of the at least two memory blocks is located entirely on the top-left portion of the image sensor circuit and is connected to provide digital signals to the plurality of top-left pads. In still further embodiments, a second additional memory block of the at least two additional memory blocks of the at least two memory blocks is located entirely on the top-right portion of the image sensor circuit and is connected to provide digital signals to the plurality of top-right pads.

By allowing for two or more memory blocks to be located to one side of a pixel array and for two or more memory blocks to be located to another side of the pixel array, the length of readout buses of the memory blocks can be reduced as compared with single memory architectures. Also, a number of memory cells connected to each readout bus can be reduced. As a result, a resistance and a capacitance associated with each of the readout buses can be correspondingly reduced and, thus, a speed of memory operations can be increased. Moreover, digital signals from each of the memory blocks can be driven to local pads on the image sensor circuit, which can reduce a distance over which the signals must be driven. As a consequence, an amount of power consumption for driving the signals can be reduced, and an amount of digital noise injected into a substrate of the image sensor circuit due to the driving of the signals can be reduced.

DETAILED DESCRIPTION OF PREFERRED EMBODIMENTS

Figure 3:
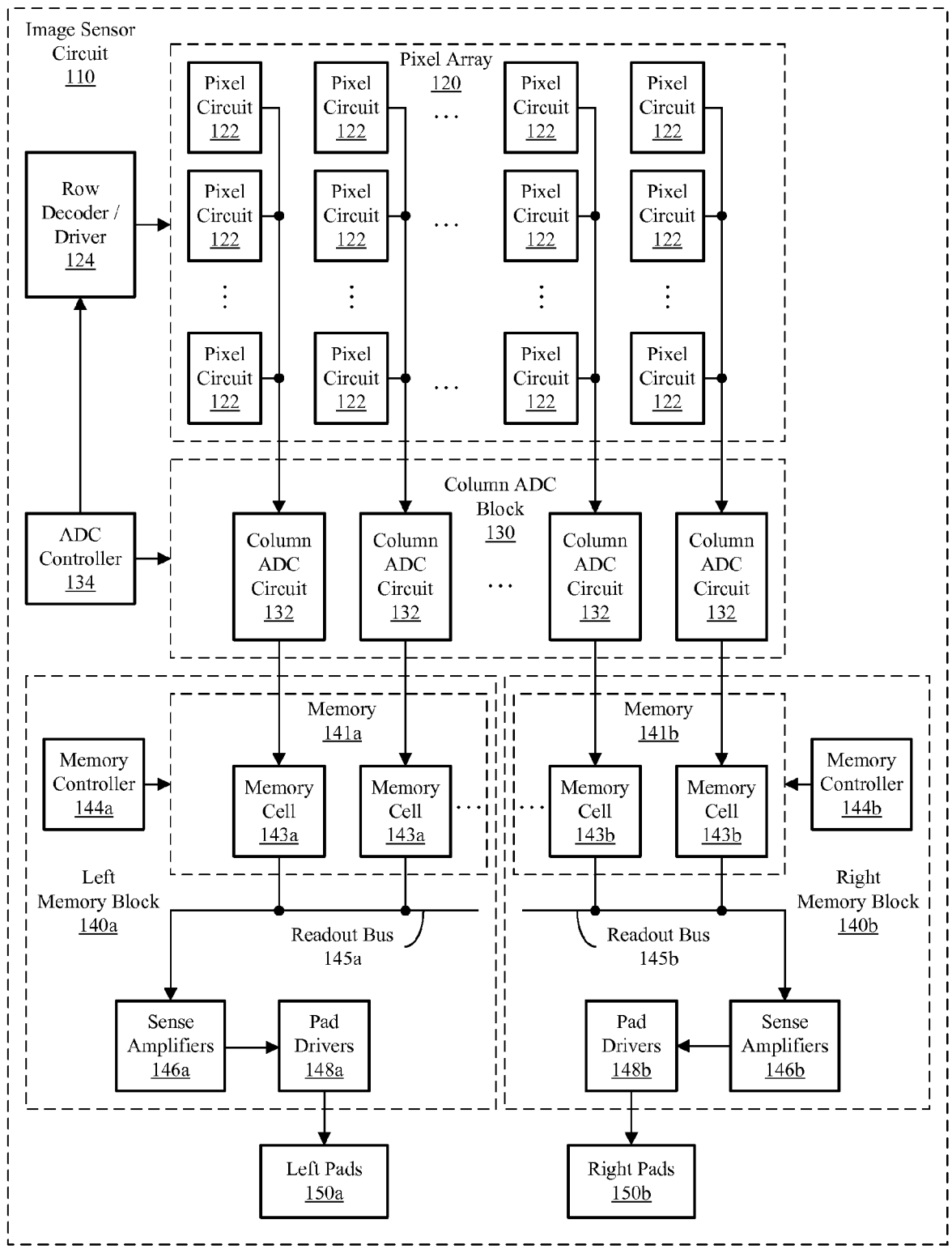
FIG. 3 illustrates a block diagram of an image sensor circuit in accordance with an embodiment of the present invention with a left memory block and a right memory block.

FIG. 3 illustrates a block diagram of an image sensor circuit 110 in accordance with an embodiment of the present invention. The image sensor circuit 110 comprises a pixel array 120, a row decoder/driver 124, a column analog-to-digital conversion (ADC) block 130, an ADC controller 134, a left memory block 140a, a right memory block 140b, left pads 150a, and right pads 150b. The image sensor circuit 110 may be, for example, a high speed complimentary metal oxide semiconductor (CMOS) image sensor circuit.

The pixel array 120 comprises a plurality of pixel circuits 122 arranged in rows and columns. Each pixel circuit 122 of the pixel array 120 is configured to sample light intensity and to provide a corresponding analog pixel signal based on the sampled light intensity. Each pixel circuit 122 of the pixel array 120 may comprise, for example, a photodiode, a photo transistor, a photogate, or the like, for sampling light intensity. If the image sensor circuit 110 is a high speed CMOS image sensor circuit, then each pixel circuit 122 of the pixel array 120 may comprise, for example, a CMOS sensor.

Analog pixel signals provided by the plurality of pixel circuits 122 may be, for example, current signals, voltage signals, charge signals, or the like. Each analog pixel signal may be based on, for example, a sampled light intensity of a portion of a scene being imaged. In some embodiments, analog pixel signals may have a single component for representing a value of sampled light intensity, while in other embodiments, analog pixel signals may have more than one component, such as having both a photosignal component and a reference "reset" level component for representing a value of sampled light intensity.

The row decoder/driver 124 supplies control signals to the plurality of pixel circuits 122 in the pixel array 120. In some embodiments, pixel circuits 122 that are in a same row of the pixel array 120 share a common row control signal from the row decoder/driver 124. In various embodiments, there may be on the order of 1,000 to 2,000 pixel circuits 122 in each row of the pixel array 120. Also, in various embodiments, pixel circuits 122 that are in a same column of the pixel array 120 may share a common column readout line to provide output. The row decoder/driver 124 may, for example, control the pixel circuits 122 in the pixel array 120 to perform processing row by row in which pixel circuits 122 in a same row of the pixel array 120 sample light intensity during a first time period and provide analog pixel signals as output on respective column readout lines during a second time period.

Analog pixel signals output from the pixel array 120 are provided to the column ADC block 130. The column ADC block 130 comprises a plurality of column ADC circuits 132. Each column ADC circuit 132 of the column ADC block 130 is connected to receive analog pixel signals provided from corresponding pixel circuits 122 of the pixel array 120. Each column ADC circuit 132 is also configured to convert the received analog pixel signals into digital pixel signals. The ADC controller 134 controls operations of the column ADC circuits 132 of the column ADC block 130, and may also control operations of the row decoder/driver 124.

In various embodiments, each column ADC circuit 132 is connected to receive analog pixel signals from a corresponding column of pixel circuits 122 in the pixel array 120. Also, in various embodiments, there may be one column ADC circuit 132 for each column of pixel circuits 122 in the pixel array 120, while in various other embodiments, there may be more than one or less than one column ADC circuit 132 for each column of pixel circuits 122 in the pixel array 120. In some embodiments, each of the column ADC circuits 132 in the column ADC block 130 may perform processing in parallel with the other column ADC circuits 132 in the column ADC block 130, and such configurations are known as "column-parallel" architectures.

Figure 4:
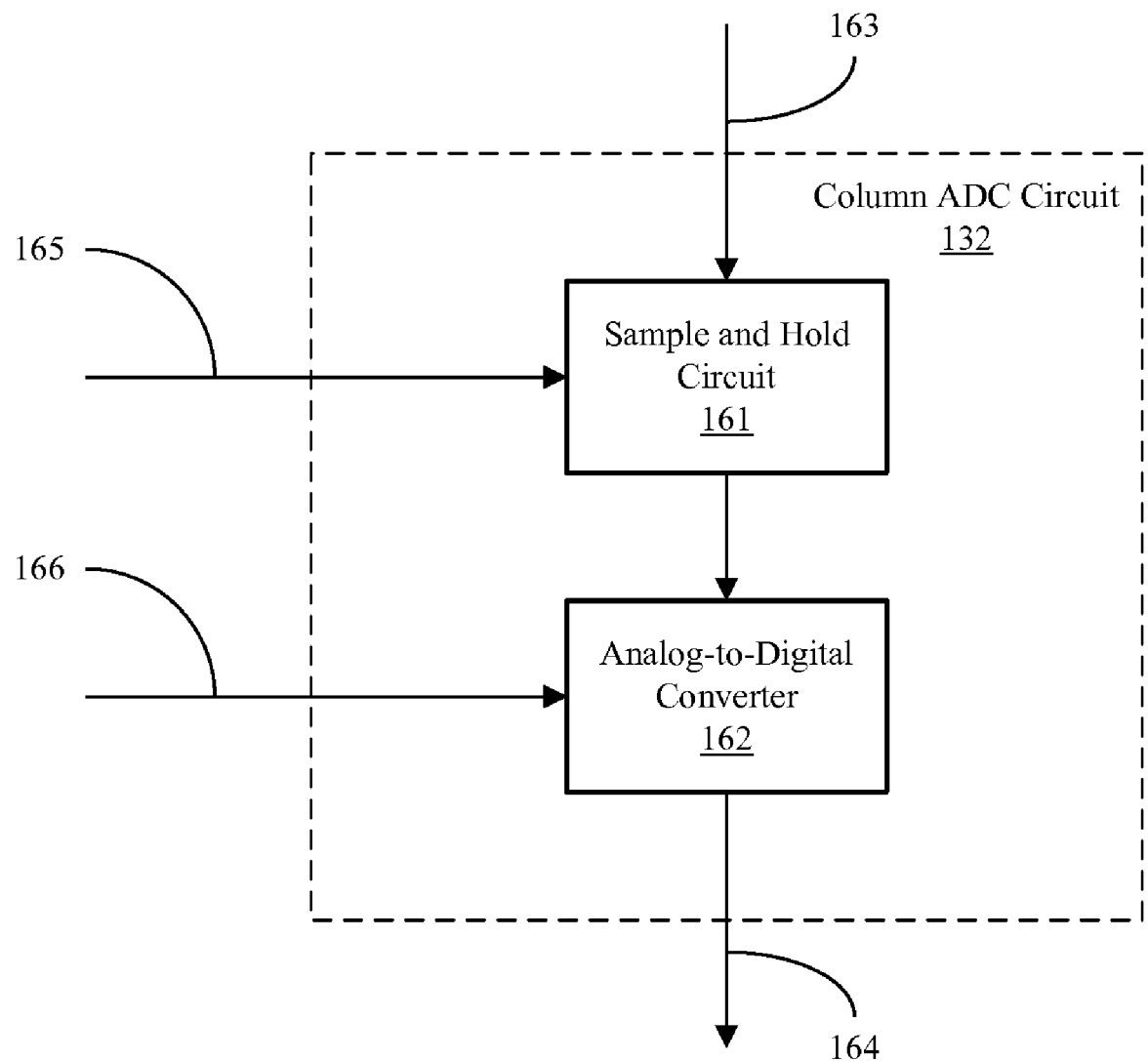
FIG. 4 illustrates a block diagram of an embodiment of a column ADC circuit.

FIG. 4 illustrates a block diagram of an embodiment of the column ADC circuit 132. The column ADC circuit 132 may comprise, for example, a sample-and-hold circuit 161 and an analog-to-digital converter 162. In various embodiments, the column ADC circuit 132 may comprise more than one sample-and-hold circuit 161 and more than one analog-to-digital converter 162. Also, in some embodiments, the column ADC circuit 132 may further comprise one or more amplifiers.

The sample-and-hold circuit 161 receives analog pixel signals from corresponding pixel circuits in the pixel array 120 over a signal line 163. If the analog pixel signals include, for example, both a photosignal component and a reference "reset" level component, then the sample-and-hold circuit 161 may be configured to store the photosignal component and the reference reset level component. The sample-and-hold circuit 161 may be controlled by the ADC controller 134 that supplies control signals over control line 165. A difference between the photosignal component and the reference reset level stored in the sample-and-hold circuit 161 may be amplified and provided to the analog-to-digital converter 162.

The analog-to-digital converter 162 may be, for example, an analog-to-digital converter of a successive-approximation type. The analog-to-digital converter 162 receives analog signals provided from the sample-and-hold circuit 161, and the analog-to-digital converter 162 is configured to convert the received analog signals into corresponding digital pixel signals to be provided on an output line 164. Operations of the analog-to-digital converter 162 may be controlled by the ADC controller 134 that supplies control signals over a control line 166. In various embodiments, the digital pixel signals provided by the analog-to-digital converter 162 may specify digital pixel values as one or more bits, such as, for example, ten bits for each digital pixel value.

As illustrated in FIG. 3, in various embodiments the column ADC block 130 is located to one side of the pixel array 120 such that the column ADC circuits 132 of the column ADC block 130 are located to one side of the pixel array 120. Also, in various embodiments, the column ADC circuits 132 of the column ADC block 130 all receive analog pixel signals that are output from a same side of the pixel array 120, and that are output in a same direction from the pixel array 120. In some embodiments, the column ADC block 130 spans a length of a row of pixel circuits 122 in the pixel array 120, which may be a length, for example, on the order of 10 mm to 20 mm long.

The left memory block 140a is connected to receive digital pixel signals provided by corresponding column ADC circuits of the plurality of column ADC circuits 132 of the column ADC block 130. Also, the right memory block 140b is connected to receive digital pixel signals provided by corresponding column ADC circuits of the plurality of column ADC circuits 132 of the column ADC block 130. In various embodiments, the outputs from column ADC circuits of the column ADC block 130 that are input to a same memory block may be multiplexed onto one or more buses to be provided to the memory block. The left memory block 140a may be located on the image sensor circuit 110, for example, to the left of the right memory block 140b.

The left memory block 140a comprises a memory 141a, a memory controller 144a, a readout bus 145a, one or more sense amplifiers 146a, and one or more pad drivers 148a. The memory 141a comprises a plurality of memory cells 143a. In various embodiments, the number of memory cells 143a in the memory 141a is greater than or equal to a number of column ADC circuits that supply digital pixel signals to the left memory block 140a. Each memory cell 143a may comprise, for example, a dynamic random access memory (DRAM) cell, a static random access memory (SRAM) cell, or the like, for storing digital values. Each memory cell 143a of the memory 141a is configured to store digital pixel values corresponding to digital pixel signals received by the left memory block 140a. In various embodiments, each memory cell 143a may be configured to store more than one bit, such as, for example, storing ten bits for a digital pixel value.

The memory controller 144a controls operations of the memory cells 143a of the memory 141a. For example, the memory controller 144a may control a read operation, a write operation, and the like, of each of the memory cells 143a of the memory 141a. In various embodiments, the memory controller 144a comprises a counter that includes a plurality of flip-flops for providing control signals to specify when each memory cell 143a of the memory 141a should provide output on the readout bus 145a.

The readout bus 145a is connected to the memory cells 143a of the memory 141a, and is also connected to the one or more sense amplifiers 146a. The readout bus 145a may comprise one or more bit lines. In some embodiments, the readout bus 145a comprises a same number of bit lines as a number of bits in a digital pixel value stored in a memory cell. Also, in some embodiments, the readout bus 145a has a length that spans a length of the memory 141a.

The one or more sense amplifiers 146a allow for sensing digital signals placed on corresponding bit lines of the readout bus 145a from the memory cells 143a, and provide the sensed digital signals to the one or more pad drivers 148a. Each of the one or more pad drivers 148a may comprise, for example, a buffer or the like, for driving digital signals to the left pads 150a. The left pads 150a may comprise, for example, output pads, input/output pads, output ports, input/output ports, or the like, for outputting digital signals from the image sensor circuit 110. The left pads 150a may be located, for example, on a left portion of the image sensor circuit 110 with respect to a location of a center of the pixel array 120.

The right memory block 140b comprises a memory 141b, a memory controller 144b, a readout bus 145b, one or more sense amplifiers 146b, and one or more pad drivers 148b. The memory 141b comprises a plurality of memory cells 143b. In various embodiments, the memory 141b, the memory controller 144b, the readout bus 145b, the one or more sense amplifiers 146b, and the one or more pad drivers 148b of the memory block 140b have same functions as the memory 141a, the memory controller 144a, the readout bus 145a, the one or more sense amplifiers 146a, and the one or more pad drivers 148a, respectively. In various embodiments, a design of the left memory block 140a may be mirrored to provide the right memory block 140b.

The right memory block 140b is connected to receive digital pixel signals provided from corresponding column ADC circuits of the plurality of column ADC circuits 132 of the column ADC block 130. In various embodiments, the right memory block 140b and the left memory block 140a receive digital pixel signals from different column ADC circuits of the plurality of column ADC circuits 132 of the column ADC block 130. The right memory block 140b provides digital signals as output to the right pads 150b. The right pads 150b may be located, for example, on a right portion of the image sensor circuit 110 with respect to a location of a center of the pixel array 120.

Figure 1:
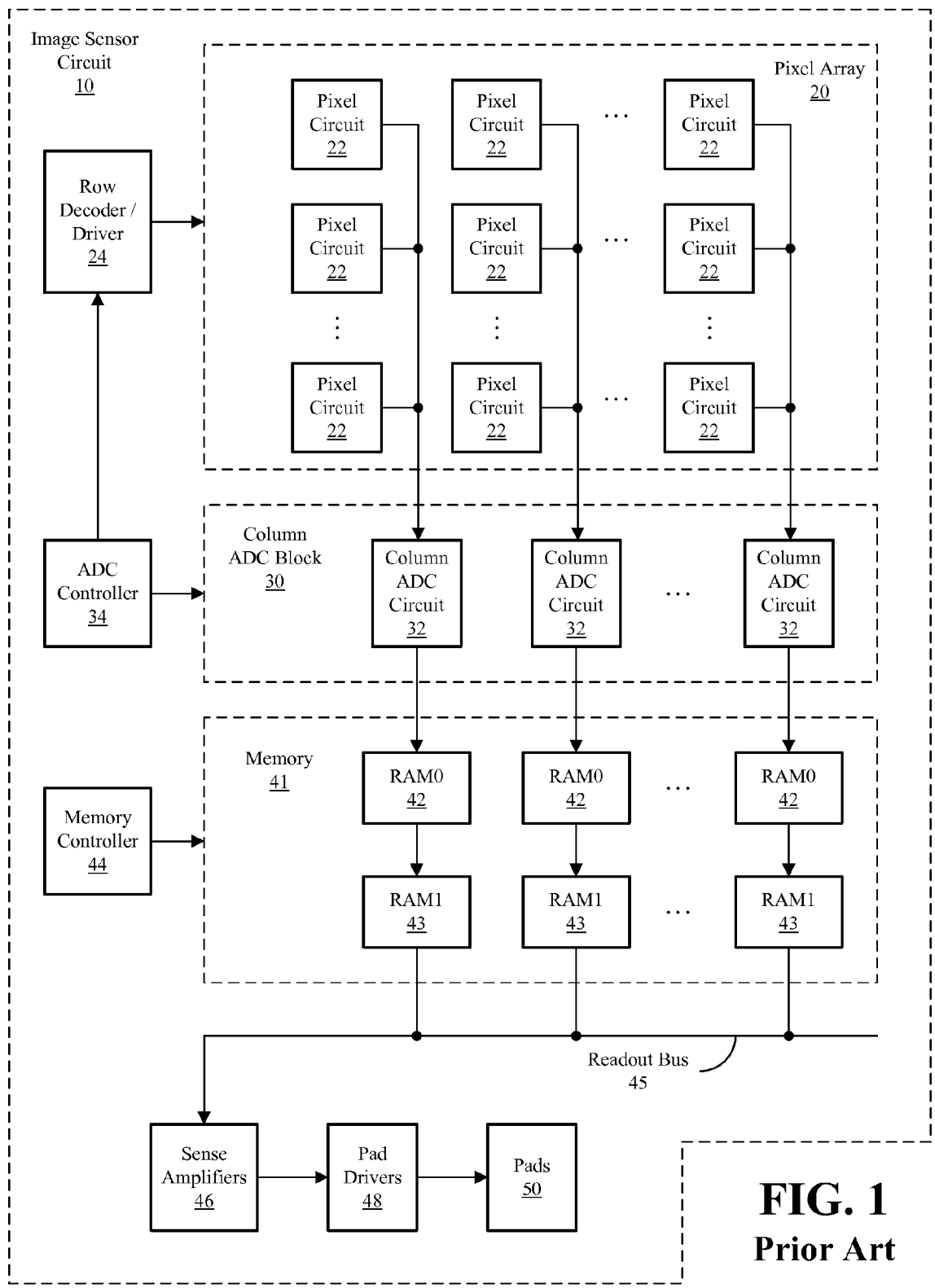
FIG. 1 illustrates a simplified architecture of a prior art high speed CMOS image sensor circuit.
Figure 2:
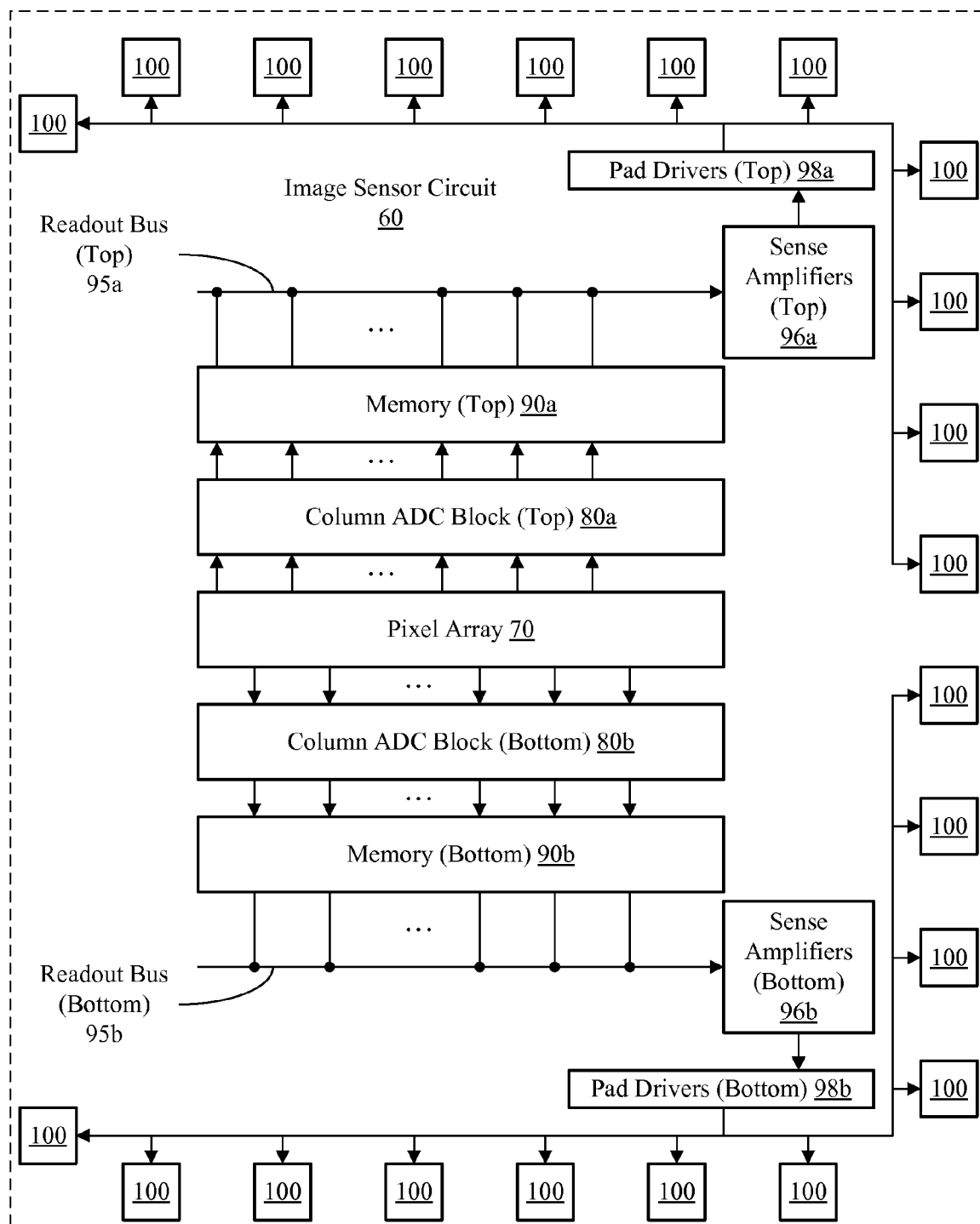
FIG. 2 illustrates a simplified architecture of a prior art high speed CMOS image sensor circuit having both a top column ADC block above a pixel array and a bottom column ADC block below the pixel array.

Various advantages of the image sensor circuit 110 with block memory readout will now be explained in comparison to the single memory architecture of the image sensor circuit 10 of FIG. 1. The image sensor circuit 110 includes two memory blocks, namely, the left memory block 140a and the right memory block 140b. In various embodiments, the left memory block 140a may receive digital pixel signals from one-half of the column ADC circuits 132 of the column ADC block 130 and the right memory block 140b may receive digital pixel signals from the other half of the column ADC circuits 132 of the column ADC block 130.

Accordingly, a number of memory cells 143a connected to the readout bus 145a of the left memory block 140a may be, for example, one-half of a number of RAM cells RAM1 43 connected to the readout bus 45 of the image sensor circuit 10. Also, a number of memory cells 143b connected to the readout bus 145b of the right memory block 140b may similarly be, for example, one-half of a number of RAM cells RAM1 43 connected to the readout bus 45 of the image sensor circuit 10. As a result, a capacitance associated with the readout bus 145a may be, for example, one-half of a capacitance associated with the readout bus 45. Also, a capacitance associated with the readout bus 145b may similarly be, for example, one-half of a capacitance associated with the readout bus 45.

In addition, with the left memory block 140a and the right memory block 140b, the readout bus 145a of the left memory block 140a does not have to span a length of the pixel array 120, but may only need to span, for instance, a length of the memory 141a. Thus, a length of the readout bus 145a may be, for example, one-half of a length of the readout bus 45 of the image sensor circuit 10. Similarly, a length of the readout bus 145b may be, for example, one-half of a length of the readout bus 45 of the image sensor circuit 10. As a consequence of the shorter lengths of the readout buses, a resistance associated with the readout bus 145a and a resistance associated with the readout bus 145b may each be, for example, one-half of a resistance associated with the readout bus 45 of the image sensor circuit 10.

By reducing a resistance and a capacitance associated with the readout bus 145a as compared to the resistance and the capacitance associated with the readout bus 45, a speed of memory readout operations can be increased on the readout bus 145a as compared to the readout bus 45. A similar increase in a speed of memory operations can be realized with memory readout operations on the readout bus 145b. Thus, by using memory blocks rather than a single memory, a speed of memory readout operations can be increased. For example, the splitting of a single memory into two memory blocks may potentially make memory readout operations on the order of four times faster due to the reduced resistance and reduced capacitance associated with readout buses connected to memory cells.

Moreover, the left memory block 140a has its own sense amplifiers 146a and its own pad drivers 148a that can drive data signals to nearby left pads 150a. The readout of data on readout bus 145a can allow for data signals to travel to the left over the readout bus 145a to the one or more sense amplifiers 146a. Similarly, the right memory block 140b has its own sense amplifiers 146b and its own pad drivers 148b that can drive data signals to nearby right pads 150b. The readout of data on readout bus 145b can allow for data signals to travel to the right over the readout bus 145b to the one or more sense amplifiers 146b. As a consequence, an amount of power for driving data signals to pads can be reduced as compared with related art image sensor circuits, because a distance over which the data signals must be driven to pads can be reduced. Also, an injection of digital noise into a substrate can be reduced, because the data signals can be driven to pads over shorter distances and with less power.

A further advantage of a memory block architecture is that, in various embodiments, only the memory needs to be split into blocks, rather than also splitting a pixel array into panels. Since, in various embodiments, the memory is essentially a digital circuit, splitting a memory into blocks does not corrupt stored data, which is digital. Analog signals in an image sensor circuit do not have to be affected to switch to a block memory architecture and, as a result, a uniformity of images can be maintained. A still further advantage of a block memory architecture is that a single memory block may be designed and then the design can be reused for other memory blocks of an image sensor circuit, which can reduce design and manufacturing time and cost.

Figure 5A:
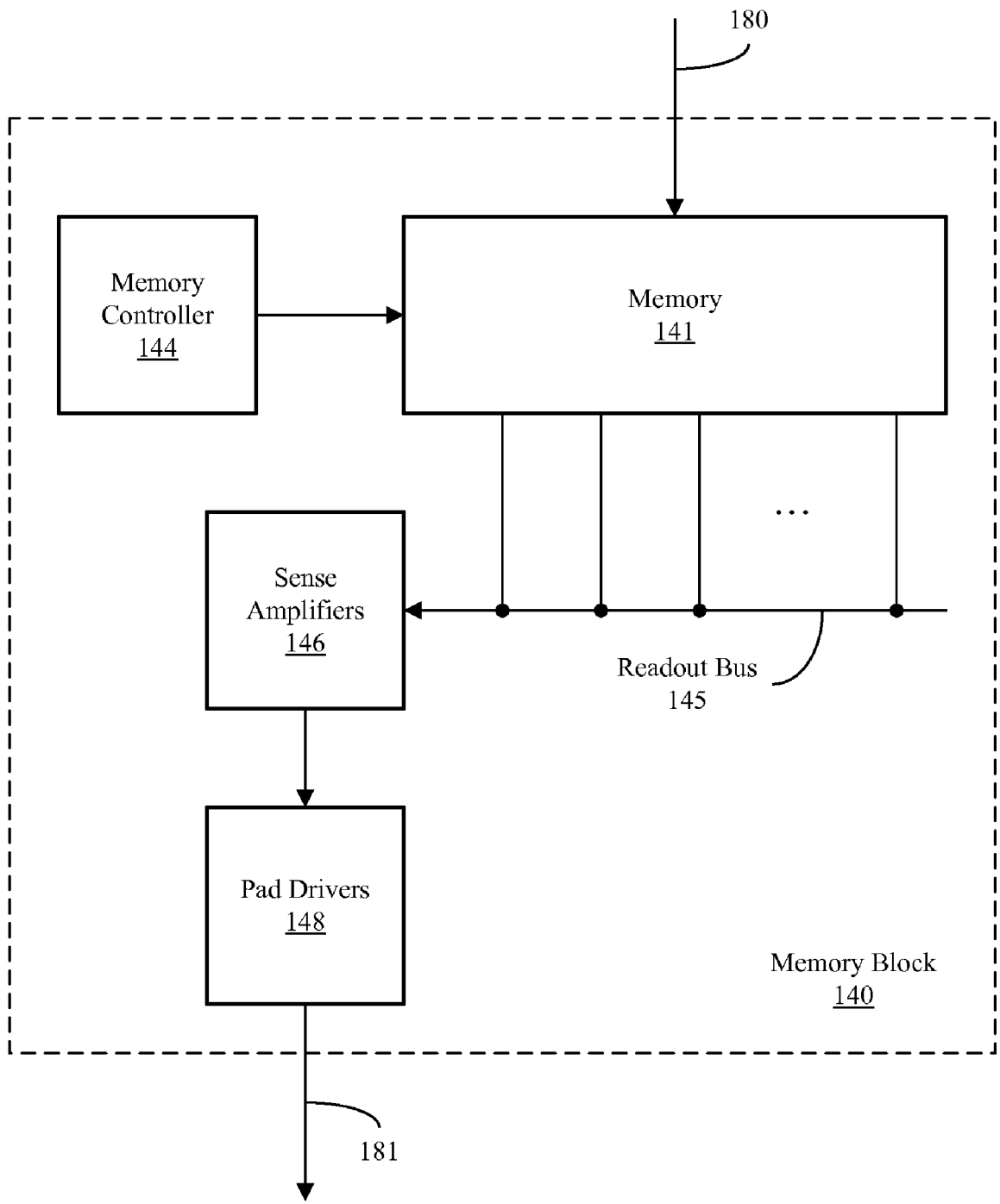
FIG. 5A illustrates a block diagram of a memory block in accordance with an embodiment of the present invention.

FIG. 5A illustrates a block diagram of a memory block 140 in accordance with an embodiment of the present invention. The memory block 140 comprises a memory 141, a memory controller 144, a readout bus 145, one or more sense amplifiers 146, and one or more pad drivers 148. Digital pixel signals are input on an input bus 180 to the memory 141. Also, digital pixel signals are output from the pad drivers on an output bus 181. The memory controller 144 controls operations of the memory 141 to perform, for example, read operations, write operations, and the like. The memory controller 144 may comprise a counter that includes a plurality of flip-flops for determining when to issue various control signals to the memory 141. In various embodiments, the memory controller 144 is located to the left of the memory 141. In various other embodiments, the memory controller 144 may be located to other sides of the memory 141, such as above the memory 141, below the memory 141, or to the right of the memory 141.

Figure 5B:
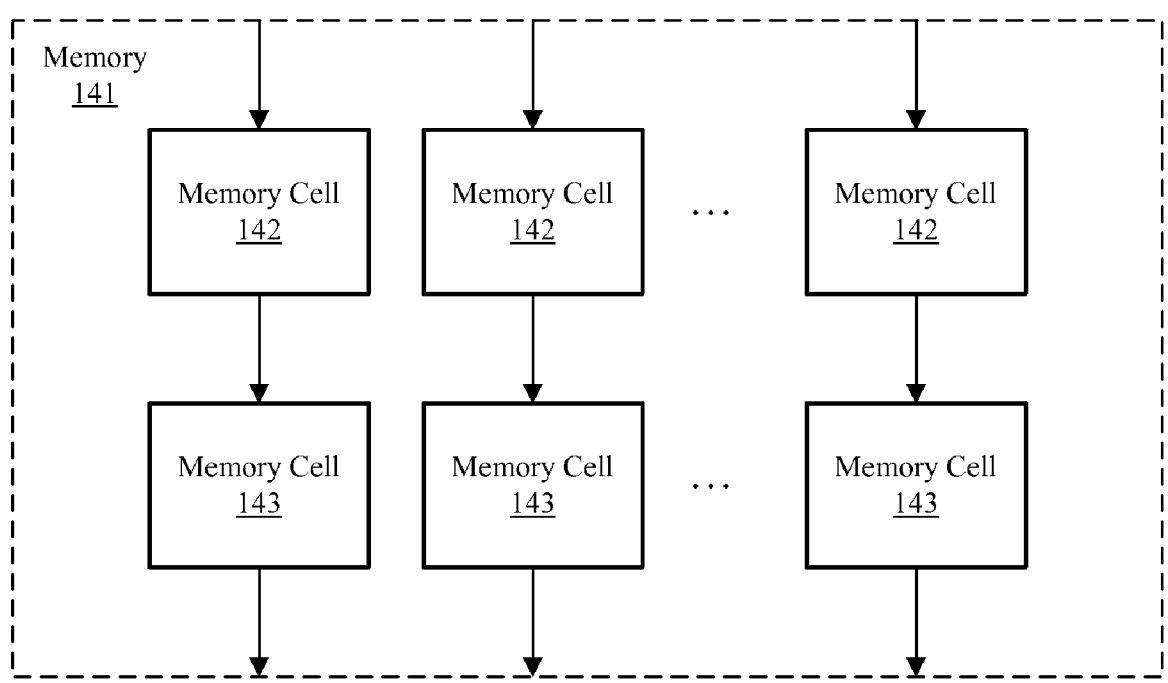
FIG. 5B illustrates a block diagram of an embodiment of a memory.

An embodiment of the memory 141 is illustrated by the block diagram of FIG. 5B. In various embodiments, the memory 141 comprises a plurality of memory cells 142 in a first row and a plurality of memory cells 143 in a second row. The memory cells 142 and the memory cells 143 may comprise, for example, DRAM cells, SRAM cells, or the like, for storing digital data. The memory controller 144 may control the memory cells 142 in the first row of the memory 141 to read in data during a first time period while the memory controller 144 controls the memory cells 143 in the second row to output data to the readout bus 145. The memory controller 144 may also control the memory cells 142 in the first row to output data during a second time period while the memory controller 144 controls the memory cells 143 in the second row to read in data from corresponding memory cells 142. Various other embodiments for the memory 141 are possible. For example, in various embodiments, the memory cells 142 in the first row may also be connected to output data to a readout bus that is in addition to the readout bus 145.

The readout bus 145 of the memory block 140 is connected to the memory cells 143 in the second row of the memory 141 and is also connected to the one or more sense amplifiers 146. The readout bus 145 may comprise one or more bit lines. In various embodiments, the memory 141 has a number of memory cells 143 in the second row that is equal to a number of column ADC circuits that supply digital pixel signals to the memory block 140. Also, in various embodiments, the readout bus 145 spans the length of the second row of memory cells 143 in the memory 141. In some embodiments, the memory block 140 comprises a plurality of readout buses, where each readout bus of the plurality of readout buses is selectively connected to corresponding memory cells in the memory 141.

The one or more sense amplifiers 146 sense digital signals that are placed on the readout bus 145 from the memory cells 143 in the second row of the memory 141. In various embodiments, there is one sense amplifier 146 for each bit line of the readout bus 145. The output of the one or more sense amplifiers 146 is provided to the one or more pad drivers 148. Each of the one or more pad drivers 148 may comprise, for example, a buffer for driving signals to pads over the output bus 181.

Figure 6:
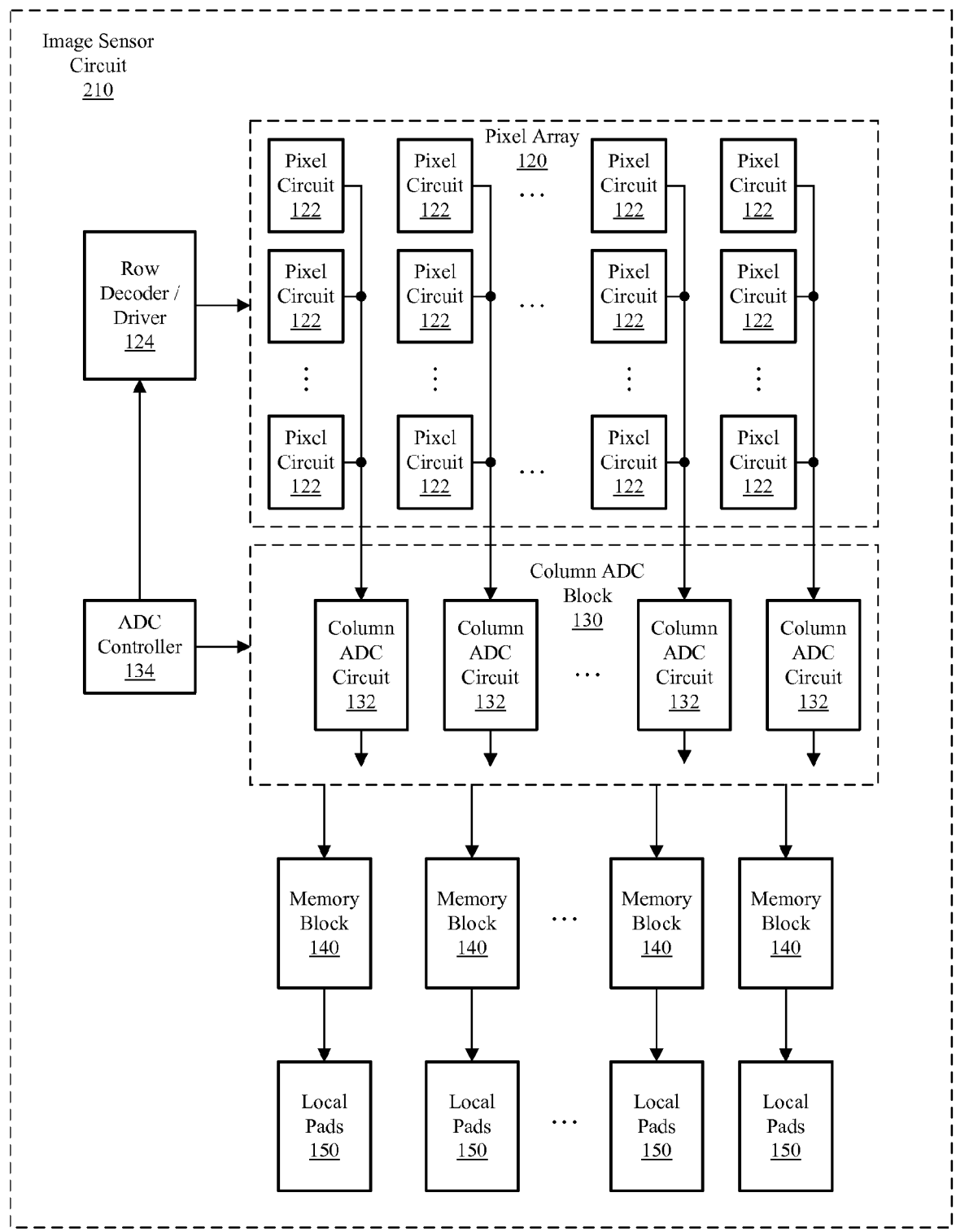
FIG. 6 illustrates a block diagram of an image sensor circuit in accordance with an embodiment of the present invention with a plurality of memory blocks.

FIG. 6 illustrates a block diagram of an image sensor circuit 210 in accordance with an embodiment of the present invention. The image sensor circuit 210 comprises a pixel array 120, a row decoder/driver 124, a column ADC block 130, an ADC controller 134, a plurality of memory blocks 140, and a plurality of local pads 150. The image sensor circuit 210 is similar to the image sensor circuit 110, and like numbered elements in each of the image sensor circuits perform similar functions, so the discussion above with respect to those elements applies also to the image sensor circuit 210.

While the image sensor circuit 110 has been shown with two memory blocks 140a and 140b connected to the column ADC block 130, the image sensor circuit 210 is shown with a plurality of memory blocks 140 connected to the column ADC block 130, which may be two or more memory blocks. In various embodiments, each of the plurality of memory blocks 140 of the image sensor circuit 210 has a configuration as illustrated in FIG. 5A. Also, in various embodiments, the memory block 140 of FIG. 5A may be mirrored to provide some of the memory blocks 140 of the image sensor circuit 210.

Each memory block 140 of the image sensor circuit 210 is connected to receive digital pixel signals provided from corresponding column ADC circuits of the plurality of column ADC circuits 132 of the column ADC block 130. In various embodiments, the outputs from two or more of the column ADC circuits 132 may be multiplexed together on a bus to be provided to a corresponding memory block of the memory blocks 140. Each memory block 140 in the image sensor circuit 210 may output digital signals to corresponding local pads 150.

By splitting a single memory into, for example, N memory blocks as with the plurality of memory blocks 140 of the image sensor circuit 210, several advantages are realized. First, bit lines of readout buses in each of the memory blocks 140 become much shorter, because rather than spanning the length of a row of pixel circuits 122 in the pixel array 120, they may only need to span, for example, a length that is on the order of a length of a row of pixel circuits 122 in the pixel array 120 divided by N. Reducing the lengths of the bits lines of the readout buses correspondingly reduces a resistance associated with each of the bit lines.

Second, a number of memory cells connected to the readout buses of each of the memory blocks 140 can be reduced significantly, because rather than having a number of memory cells connected to a readout bus that is equal to a number of pixel circuits 122 in a row of the pixel array 120, there may only need to be, for example, a number of memory cells connected to each readout bus that is on the order of a number of pixel circuits 122 in a row of the pixel array 120 divided by N. Reducing the number of memory cells connected to each bit line of the readout buses correspondingly reduces a capacitance associated with each of the bit lines.

By reducing the resistance of each of the bit lines of the readout buses by a factor of N and by reducing the capacitance of each of the bit lines of the readout buses by a factor of N, memory readout operations for each memory block 140 become potentially N^2 times faster than with a single memory. Thus, replacing a single memory with N memory blocks may make memory readout operations potentially on the order of N squared times faster.

Third, each memory block 140 may have, for example, its own sense amplifiers and its own pad drivers. Thus, data signals output from each memory block 140 can be driven to corresponding nearby local output pads 150. By driving data signals over shorter distances to local pads 150, on-chip power can be reduced, and there can be a reduction in an injection of digital noise into a substrate of the image sensor circuit 210.

Fourth, the image sensor circuit 210 may preserve the uniform column-parallel readout from the pixel circuits 122 of the pixel array 120 and may preserve the parallel operations of the column ADC circuits 132 of the column ADC block 130. Thus, all analog operations may still be performed in parallel, which may ensure a uniformity of an output image. In the image sensor circuit 210, even though there are a plurality of memory blocks 140, since the memory blocks 140 store mainly digital data, there is little risk that the data, which is digital, will be corrupted. Thus, replacing a single memory with a plurality of memory blocks may still allow for preserving image uniformity. Other advantages of designing an image sensor circuit with memory blocks include reductions in design and manufacturing costs that can be realized by designing one memory block and then replicating or mirroring the designed memory block to provide for other memory blocks.

Figure 7A:
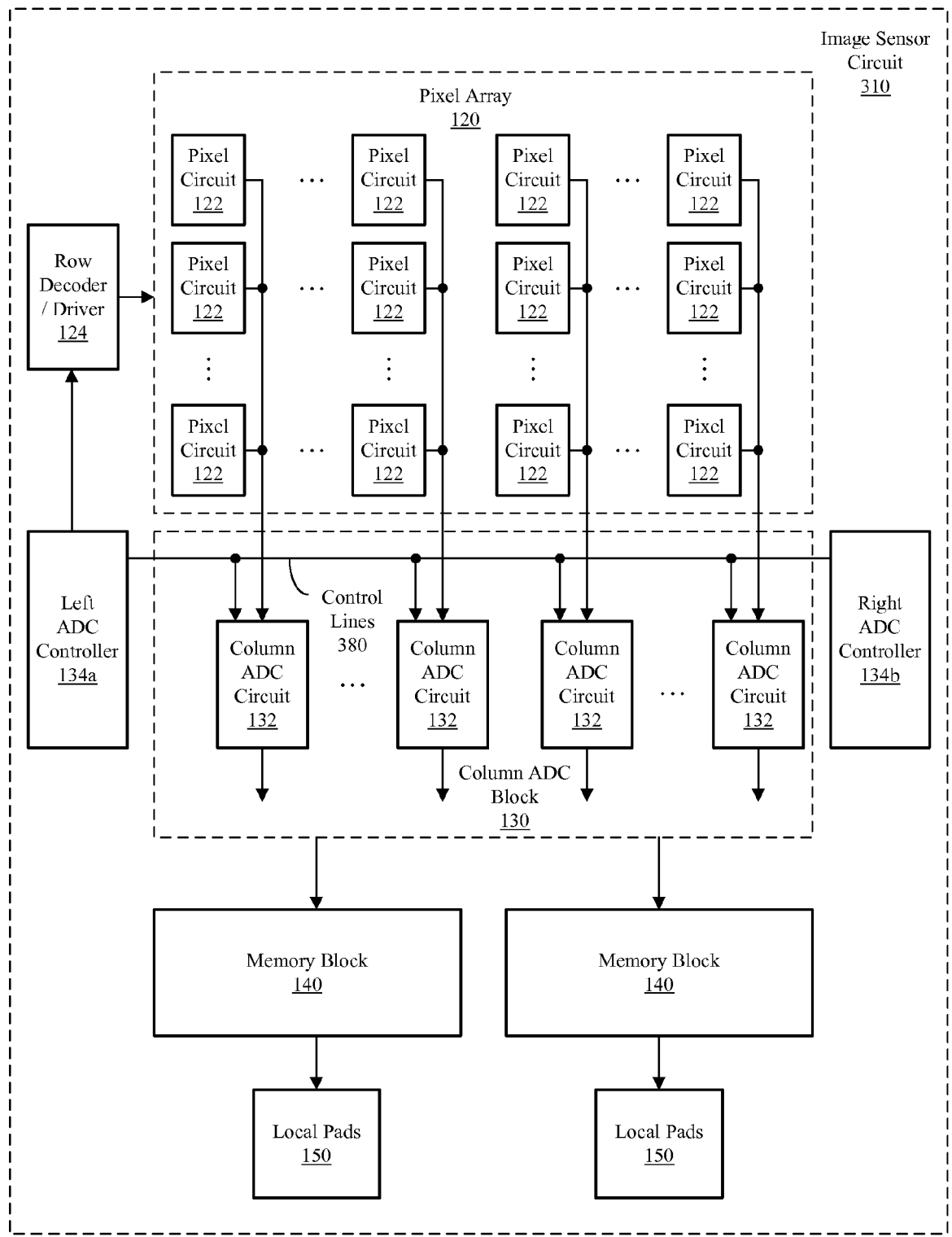
FIG. 7A illustrates a block diagram of an image sensor circuit in accordance with another embodiment of the present invention with a left ADC controller and a right ADC controller connected to drive control signals on same control lines.

FIG. 7A illustrates a block diagram of an image sensor circuit 310 in accordance with another embodiment of the present invention. The image sensor circuit 310 comprises a pixel array 120, a row decoder/driver 124, a column ADC block 130, a left ADC controller 134a, a right ADC controller 134b, and at least two memory blocks 140 connected to corresponding local pads 150. The image sensor circuit 310 is similar to the image sensor circuit 110 and the image sensor 210, and like numbered elements in each of the image sensor circuits perform similar functions, so the discussion above with respect to those elements applies also to the image sensor circuit 310.

The image sensor circuit 310 differs from the image sensor circuit 110 and the image sensor circuit 210 in that the image sensor circuit 310 has both a left ADC controller 134a located to the left of the column ADC block 130 and a right ADC controller 134b located to the right of the column ADC block 130. The column ADC circuits 132 of the column ADC block 130 of the image sensor circuit 310 may each receive analog pixel signals that are output in a same direction from the pixel array 120 and that are output from a same side of the pixel array 120. The column ADC circuits 132 of the column ADC block 130 in the image sensor circuit 310 may all be located to a same side of the pixel array 120.

The left ADC controller 134a and the right ADC controller 134b of the image sensor circuit 310 are connected to the column ADC circuits 132 of the column ADC block 130 by control lines 380. Thus, in the image sensor circuit 310, the left ADC controller 134a and the right ADC controller 134b drive control signals over the same control lines 380. The left ADC controller 134a may also control operations of the row decoder/driver 124.

The control signals sent on the control lines 380 from the left ADC controller 134a and the right ADC controller 134b may control, for example, operations of the column ADC circuits 132 to perform conversion of analog pixel signals into digital pixel signals. In the image sensor circuit 310, the left ADC controller 134a and the right ADC controller 134b are configured to drive the same control signals on the control lines 380 at the same time. In order to have the left ADC controller 134a and the right ADC controller 134b drive the same control signals at the same time, a clock signal that is provided to the left ADC controller 134a and to the right ADC controller 134b should be routed from a location between the two ADC controllers such that each ADC controller receives the clock signal at basically the same time.

By driving control signals to the column ADC circuits 132 from both a left ADC controller 134a and a right ADC controller 134b, a propagation delay for sending the control signals to all of the column ADC circuits 132 may be reduced, for example, in half as compared to configurations in which a single ADC controller drives signals from one side of the ADC block 130. The reduction in the propagation delay for the control signals is realized because the control signals no longer have to travel all the way across the column ADC block 130 before reaching all of the column ADC circuits 132, but rather the control signals are sent from both sides of the column ADC block 130 and ideally converge in the middle of the column ADC block 130. Since the column ADC block 130 usually spans a length of the pixel array 120, and the pixel array 120 may be, for example, on the order of 10 mm to 20 mm long, a propagation delay when there is only a single ADC controller for a column ADC block can be significant. Thus, reducing the propagation delay of the control signals may allow for increasing a speed of column ADC circuit operations.

Figure 7B:
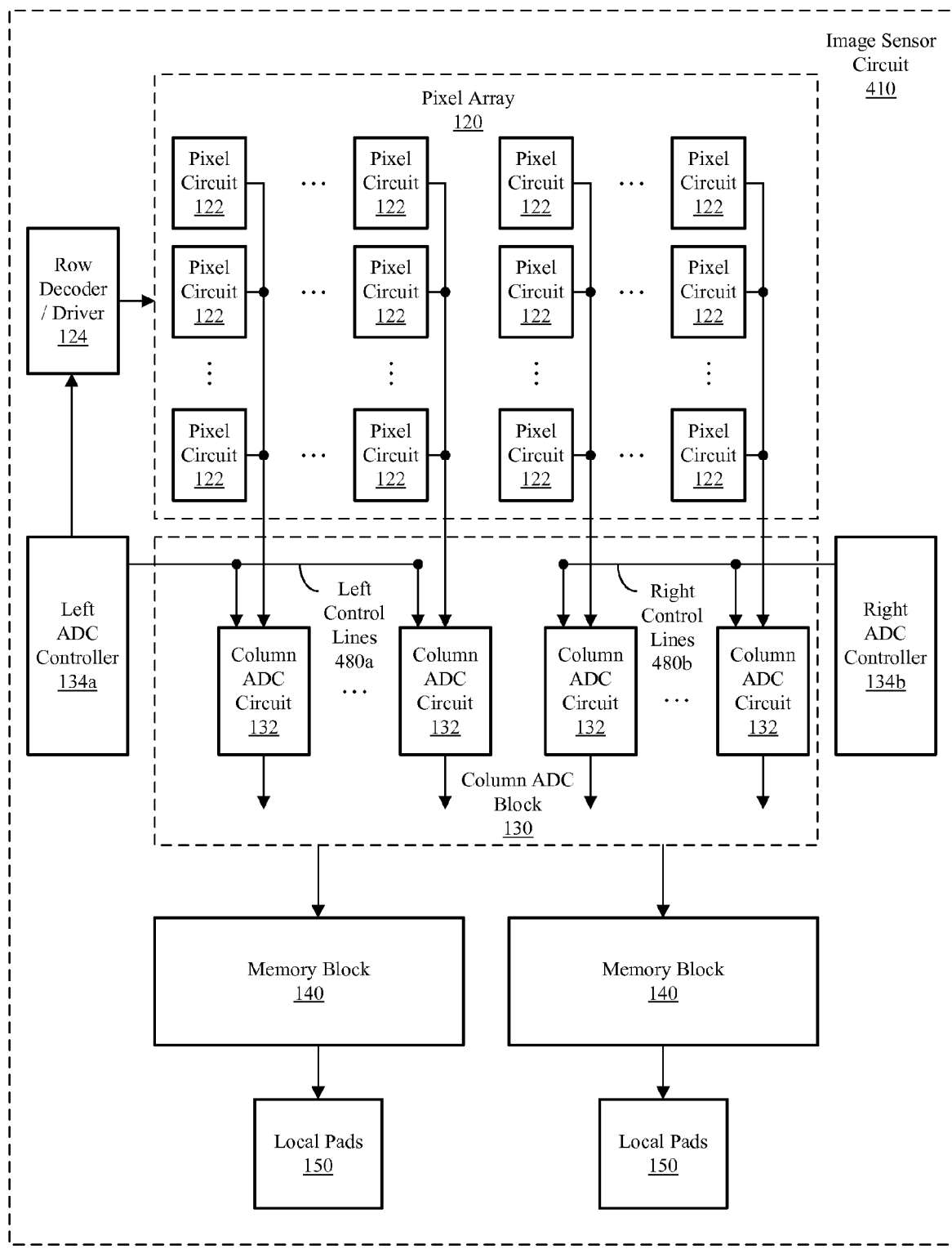
FIG. 7B illustrates a block diagram of an image sensor circuit in accordance with another embodiment of the present invention with a left ADC controller and a right ADC controller connected to drive control signals on separate control lines.

FIG. 7B illustrates a block diagram of an image sensor circuit 410 in accordance with another embodiment of the present invention. The image sensor circuit 410 is the same as the image sensor circuit 310 except that control lines 480a from the left ADC controller 134a and control lines 480b from the right ADC controller 134b are separated. The left ADC controller 134a is configured to drive control signals over the left control lines 480a at a same time that the right ADC controller 134b is driving the same control signals over the right control lines 480b. Even with the separated control lines, a propagation delay for sending the control signals to the column ADC circuits 132 can still be reduced as compared with a configuration with a single ADC controller for a column ADC block.

In the image sensor circuit 410, the left ADC controller 134a is connected to drive control signals over the left control lines 480a to a subset of the column ADC circuits of the column ADC block 130. The right ADC controller 134b is connected to drive control signals over the right controls lines 480b to the remaining column ADC circuits that are not connected to the left ADC controller 134a. In various embodiments, the left ADC controller 134a is connected to drive control signals over the left control lines 480a to all of the column ADC circuits that are located on a left portion of the image sensor circuit 410 with respect to a center of the pixel array 120. Also, in various embodiments, the right ADC controller 134b is connected to drive control signals over the right control lines 480b to all of the column ADC circuits that are located on a right portion of the image sensor circuit 410 with respect to the center of the pixel array 120. The center of the pixel array 120 may be defined for example, as a middle of a row of pixel circuits 122 in the pixel array 120.

Figure 8:
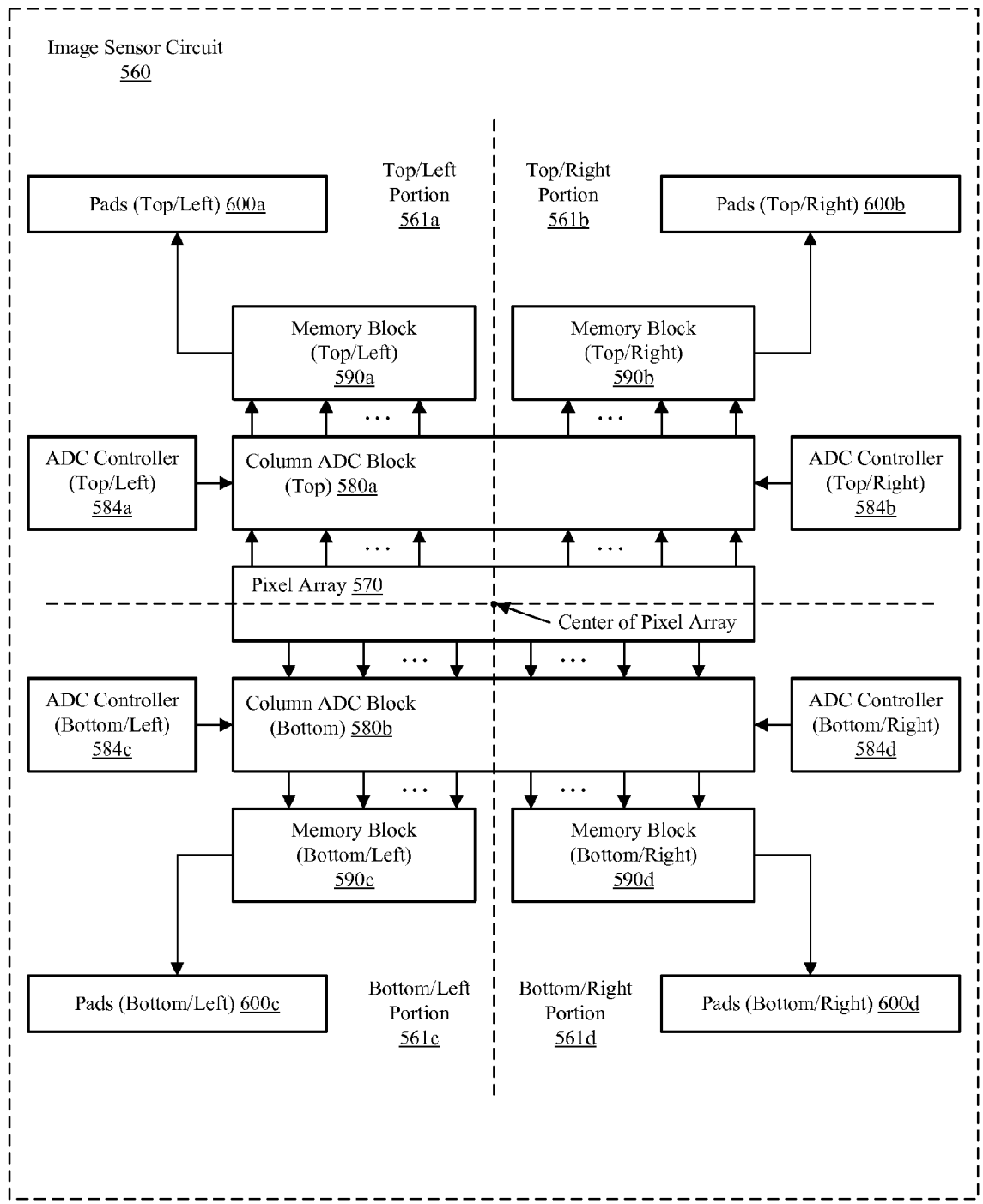
FIG. 8 illustrates an image sensor circuit in accordance with yet another embodiment of the present invention with a top/left memory block, a top/right memory block, a bottom/left memory block, and a bottom/right memory block.

FIG. 8 illustrates an image sensor circuit 560 in accordance with yet another embodiment of the present invention. The image sensor circuit 560 comprises a pixel array 570, a top column ADC block 580a, a bottom column ADC block 580b, a top/left ADC controller 584a, a top/right ADC controller 584b, a bottom/left ADC controller 584c, a bottom/right ADC controller 584d, a top/left memory block 590a, a top/right memory block 590b, a bottom/left memory block 590c, a bottom/right memory block 590d, top/left pads 600a, top/right pads 600b, bottom/left pads 600c, and bottom/right pads 600d.

The pixel array 570 comprises a plurality of pixel circuits arranged in rows and columns. A center of the pixel array may be defined as a middle of a length of a row of pixel circuits in the pixel array and as a middle of a height of a column of pixel circuits in the pixel array. The image sensor circuit 560 can then be described with respect to the center of the pixel array 570 as having a top/left portion 561a, a top/right portion 561b, a bottom/left portion 561c, and a bottom/right portion 561d.

The top/left ADC controller 584a, the top/left memory block 590a, and the top/left pads 600a are located in the top/left portion 561a of the image sensor circuit 560. The top/right ADC controller 584b, the top/right memory block 590b, and the top/right pads 600b are located in the top/right portion 561b of the image sensor circuit 560. The bottom/left ADC controller 584c, the bottom/left memory block 590c, and the bottom/left pads 600c are located in the bottom/left portion 561c of the image sensor circuit 560. The bottom/right ADC controller 584d, the bottom/right memory block 590d, and the bottom/right pads 600d are located in the bottom/right portion 561d of the image sensor circuit 560. Also, the top column ADC block 580a is located in both the top/left portion 561a and the top/right portion 561b of the image sensor circuit 560. The bottom column ADC block 580b is located in both the bottom/left portion 561c and the bottom/right portion 561d of the image sensor circuit 560.

The top column ADC block 580a comprises a plurality of column ADC circuits that are connected to receive analog pixel signals provided from corresponding pixel circuits of the pixel array 570. The bottom column ADC block 580b similarly comprises a plurality of column ADC circuits that are connected to receive analog pixel signals provided from corresponding pixel circuits of the pixel array 570. In various embodiments, the top column ADC block 580a receives analog pixel signals from pixel circuits that are in odd columns in the pixel array 570, while the bottom column ADC block 580b receives analog pixel signals from pixel circuits that are in even columns in the pixel array 570. In various other embodiments, the top column ADC block 580a receives analog pixel signals from pixel circuits that are in even columns in the pixel array 570, while the bottom column ADC block 580b receives analog pixel signals from pixel circuits that are in odd columns in the pixel array 570.

The top/left ADC controller 584a and the top/right ADC controller 584b provide control signals to control operations of the column ADC circuits of the top column ADC block 580a. The bottom/left ADC controller 584c and the bottom/right ADC controller 584d provide control signals to control operations of the column ADC circuits of the bottom column ADC block 580b. In various embodiments, the two ADC controllers for each column ADC block drive control signals on same control lines, while in various other embodiments, the two ADC controllers for each column ADC block drive control signals on separate control lines.

The top/left memory block 590a is connected to receive digital pixel signals provided from corresponding column ADC circuits of the top column ADC block 580a. The top/right memory block 590b is also connected to receive digital pixel signals provided from corresponding column ADC circuits of the top column ADC block 580a. In various embodiments, the top/left memory block 590a and the top/right memory block 590b receive digital pixel signals from different column ADC circuits of the top column ADC block 580a.

The bottom/left memory block 590c is connected to receive digital pixel signals provided from corresponding column ADC circuits of the bottom column ADC block 580b. The bottom/right memory block 590d is also connected to receive digital pixel signals provided from corresponding column ADC circuits of the bottom column ADC block 580b. In various embodiments, the bottom/left memory block 590c and the bottom/right memory block 590d receive digital pixel signals from different column ADC circuits of the bottom column ADC block 580b.

The top/left memory block 590a comprises a memory with a plurality of memory cells, a memory controller, a readout bus, one or more sense amplifiers, and one or more pad drivers. In various embodiments, data is placed on the readout bus of the top/left memory block 590a from memory cells and travels to the left on the readout bus to the one or more sense amplifiers and then is driven by the one or more pad drivers to the top/left pads 600a. The top/right memory block 590b comprises a memory with a plurality of memory cells, a memory controller, a readout bus, one or more sense amplifiers, and one or more pad drivers. In various embodiments, data is placed on the readout bus of the top/right memory block 590b from memory cells and travels to the right on the readout bus to the one or more sense amplifiers and then is driven by the one or more pad drivers to the top/right pads 600b.

The bottom/left memory block 590c comprises a memory with a plurality of memory cells, a memory controller, a readout bus, one or more sense amplifiers, and one or more pad drivers. In various embodiments, data is placed on the readout bus of the bottom/left memory block 590c from memory cells and travels to the left on the readout bus to the one or more sense amplifiers and then is driven by the one or more pad drivers to the bottom/left pads 600c. The bottom/right memory block 590d comprises a memory with a plurality of memory cells, a memory controller, a readout bus, one or more sense amplifiers, and one or more pad drivers. In various embodiments, data is placed on the readout bus of the bottom/right memory block 590d from memory cells and travels to the right on the readout bus to the one or more sense amplifiers and then is driven by the one or more pad drivers to the bottom/right pads 600d.

By allowing for two or more memory blocks 590a, 590b to be located above the pixel array 570 and for two or more memory blocks 590c, 590d to be located below the pixel array, the length of readout buses of the memory blocks 590a, 590b, 590c, 590d can be reduced as compared with single memory architectures. Also, a number of memory cells connected to each readout bus can be reduced. As a result, a resistance and a capacitance associated with each of the readout buses can be correspondingly reduced and, thus, a speed of memory operations can be increased. Moreover, digital signals from each of the memory blocks 590a, 590b, 590c, 590d can be driven to local pads on the image sensor circuit, which can reduce a distance over which the signals must be driven. As a consequence, an amount of power consumption for driving the signals can be reduced, and an amount of digital noise injected into a substrate of the image sensor circuit 560 due to the driving of the signals can be reduced.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. An image sensor circuit, comprising:
a pixel array, the pixel array comprising a plurality of pixel circuits arranged in rows and columns, each pixel circuit of the plurality of pixel circuits configured to sample light intensity and to provide a corresponding analog pixel signal based on the sampled light intensity;
a plurality of column analog-to-digital conversion (ADC) circuits, each column ADC circuit of the plurality of column ADC circuits connected to receive analog pixel signals provided from corresponding pixel circuits of the plurality of pixel circuits and configured to convert the received analog pixel signals into digital pixel signals; and
at least two memory blocks, each memory block of the at least two memory blocks connected to receive digital pixel signals provided from corresponding column ADC circuits of the plurality of column ADC circuits, at least two of the at least two memory blocks connected to receive digital pixel signals provided from corresponding column ADC circuits that are located to a same side of the pixel array, each of the at least two memory blocks comprising:
a plurality of memory cells for storing digital pixel values corresponding to the received digital pixel signals;
a readout bus;
one or more sense amplifiers connected to the plurality of memory cells by the readout bus for reading out the stored digital pixel values from the plurality of memory cells; and
a memory controller connected to the plurality of memory cells for controlling operations of the plurality of memory cells;
wherein a length of the readout bus of each memory block of the at least two memory blocks is less than one-fourth of a length of a row of pixel circuits in the pixel array.

2. The image sensor circuit of claim 1, wherein a total number of memory cells that are connected to the readout bus in each memory block of the at least two memory blocks is less than one-eighth of a number of pixel circuits in the row of pixel circuits in the pixel array.

3. The image sensor circuit of claim 2, wherein a total number of memory cells in all memory blocks of the at least two memory blocks is equal to or greater than a number of columns of pixel circuits in the pixel array.

4. The image sensor circuit of claim 1, wherein a total number of memory cells that are connected to the readout bus in each memory block of the at least two memory blocks is less than one-sixteenth of a number of pixel circuits in the row of pixel circuits in the pixel array.

5. The image sensor circuit of claim 4, wherein a total number of memory cells in all memory blocks of the at least two memory blocks is equal to or greater than a number of columns of pixel circuits in the pixel array.

6. An image sensor circuit, comprising:
a pixel array, the pixel array comprising a plurality of pixel circuits arranged in rows and columns, each pixel circuit of the plurality of pixel circuits configured to sample light intensity and to provide a corresponding analog pixel signal based on the sampled light intensity;
a plurality of column analog-to-digital conversion (ADC) circuits, each column ADC circuit of the plurality of column ADC circuits connected to receive analog pixel signals provided from corresponding pixel circuits of the plurality of pixel circuits and configured to convert the received analog pixel signals into digital pixel signals; and
at least two memory blocks, each memory block of the at least two memory blocks connected to receive digital pixel signals provided from corresponding column ADC circuits of the plurality of column ADC circuits, at least two of the at least two memory blocks connected to receive digital pixel signals provided from corresponding column ADC circuits that are located to a same side of the pixel array, each of the at least two memory blocks comprising:
a plurality of memory cells for storing digital pixel values corresponding to the received digital pixel signals;
a readout bus;
one or more sense amplifiers connected to the plurality of memory cells by the readout bus for reading out the stored digital pixel values from the plurality of memory cells; and
a memory controller connected to the plurality of memory cells for controlling operations of the plurality of memory cells;
wherein a total number of memory cells that are connected to the readout bus in each memory block of the at least two memory blocks is less than one-eighth of a number of pixel circuits in a row of pixel circuits in the pixel array.

7. The image sensor circuit of claim 6, wherein a length of the readout bus of each memory block of the at least two memory blocks is less than one-half of a length of the row of pixel circuits in the pixel array.

8. The image sensor circuit of claim 6, wherein a total number of memory cells in all memory blocks of the at least two memory blocks is equal to or greater than a number of columns of pixel circuits in the pixel array.

9. The image sensor circuit of claim 6, wherein a total number of memory cells that are connected to the readout bus in each memory block of the at least two memory blocks is less than one-sixteenth of the number of pixel circuits in the row of pixel circuits in the pixel array.

10. The image sensor circuit of claim 9, wherein a total number of memory cells in all memory blocks of the at least two memory blocks is equal to or greater than a number of columns of pixel circuits in the pixel array.

11. An image sensor circuit, comprising:
a pixel array comprising a plurality of pixel circuits arranged in rows and columns; and
at least two memory blocks, each of the at least two memory blocks comprising:
a readout bus; and
a plurality of memory cells for storing digital pixel values derived from analog signals output from the pixel array, the plurality of memory cells connected to provide output to the readout bus;
wherein a length of the readout bus of each memory block of the at least two memory blocks is less than one-half of a length of a row of pixel circuits in the pixel array.

12. The image sensor circuit of claim 11, wherein the length of the readout bus of each memory block of the at least two memory blocks is less than one-fourth of the length of the row of pixel circuits in the pixel array.

13. The image sensor circuit of claim 11, wherein a total number of memory cells that are connected to the readout bus in each memory block of the at least two memory blocks is less than one-half of a number of pixel circuits in the row of pixel circuits in the pixel array.

14. The image sensor circuit of claim 13, wherein a total number of memory cells in all memory blocks of the at least two memory blocks is equal to or greater than a number of columns of pixel circuits in the pixel array.

15. The image sensor circuit of claim 11, wherein a total number of memory cells that are connected to the readout bus in each memory block of the at least two memory blocks is less than one-fourth of a number of pixel circuits in the row of pixel circuits in the pixel array.

16. The image sensor circuit of claim 15, wherein a total number of memory cells in all memory blocks of the at least two memory blocks is equal to or greater than a number of columns of pixel circuits in the pixel array.

17. An image sensor circuit, comprising:
a pixel array comprising a plurality of pixel circuits arranged in rows and columns; and
at least two memory blocks, each of the at least two memory blocks comprising:
a readout bus; and
a plurality of memory cells for storing digital pixel values derived from analog signals output from the pixel array, the plurality of memory cells connected to provide output to the readout bus;
wherein a total number of memory cells that are connected to the readout bus in each memory block of the at least two memory blocks is less than one-half of a number of pixel circuits in a row of pixel circuits in the pixel array.

18. The image sensor circuit of claim 17, wherein a length of the readout bus of each memory block of the at least two memory blocks is less than one-fourth of a length of the row of pixel circuits in the pixel array.

19. The image sensor circuit of claim 17, wherein a total number of memory cells in all memory blocks of the at least two memory blocks is equal to or greater than a number of columns of pixel circuits in the pixel array.

20. The image sensor circuit of claim 17, wherein the total number of memory cells that are connected to the readout bus in each memory block of the at least two memory blocks is less than one-fourth of the number of pixel circuits in the row of pixel circuits in the pixel array.

* * * * *